United States Patent [19]
Fujii et al.

[11] Patent Number: 5,616,968
[45] Date of Patent: Apr. 1, 1997

[54] EXPANDABLE AC POWER SUPPLY DEVICE

[75] Inventors: Hiroshi Fujii; Shigemitsu Kiso, both of Shizuoka-ken, Japan

[73] Assignee: Omron Corporation, Nagaokakyo, Japan

[21] Appl. No.: 362,404

[22] Filed: Dec. 23, 1994

[30] Foreign Application Priority Data

Dec. 24, 1993 [JP] Japan .................................. 5-345950

[51] Int. Cl.⁶ ........................................................ H02J 7/00
[52] U.S. Cl. .............................. 307/66; 307/23; 307/150
[58] Field of Search ................................. 307/18, 19, 23, 307/43, 64, 65, 66, 85, 86, 87, 150, 11, 20, 24, 29, 44; 361/735, 790, 728, 729, 730, 731; 200/307; 364/492

[56] References Cited

U.S. PATENT DOCUMENTS

| | | | |
|---|---|---|---|
| 4,673,826 | 6/1987 | Masson | 307/66 |
| 4,916,328 | 4/1990 | Culp, III | 307/39 |
| 4,916,329 | 4/1990 | Dang et al. | 307/66 |
| 4,996,628 | 2/1991 | Harvey et al. | 361/735 |
| 5,237,208 | 8/1993 | Tominaga et al. | 307/66 |
| 5,266,838 | 11/1993 | Gerner | 307/19 |
| 5,287,053 | 2/1994 | Hutchinson | 320/2 |
| 5,369,565 | 12/1994 | Chen et al. | 363/146 |
| 5,473,528 | 12/1995 | Hirata et al. | 363/71 |

*Primary Examiner*—William M. Shoop, Jr.
*Assistant Examiner*—Jonathan S. Kaplan
*Attorney, Agent, or Firm*—Fish & Richardson, P.C.

[57] ABSTRACT

An interconnectable power supply module includes a battery; a battery charger for charging the battery; a power generator capable of converting an electrical charge stored in the battery to generate output power for an external load; a control unit for controlling operation of the power supply module; a power supply plug for receiving external power from an external power source; a power supply socket capable of coupling the external power received from the external power source to an adjacent power supply module; an external load output socket, selectively coupled to one of the external power source and the power generator, for providing output power to the external load; and a connecting terminal capable of coupling the external load output power to the adjacent power supply module.

34 Claims, 10 Drawing Sheets

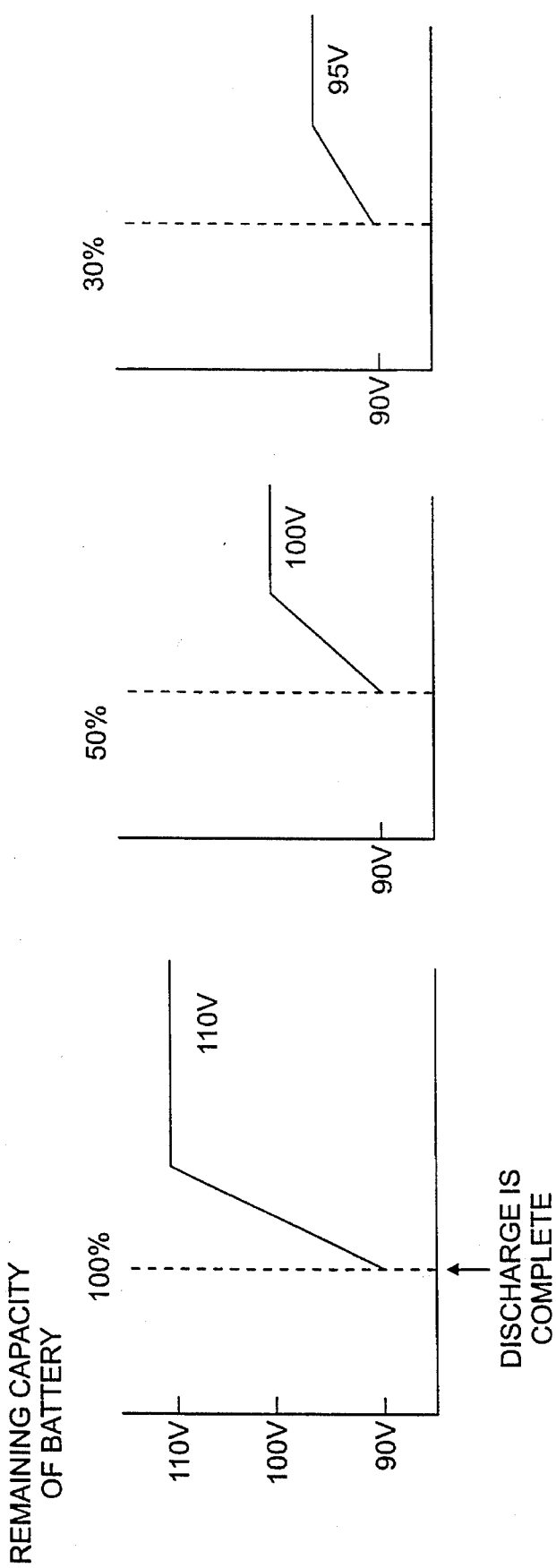

EXPANDABLE AC POWER SUPPLY DEVICE

BACKGROUND OF THE INVENTION

1. Field of the Invention

This invention concerns a expandable AC power supply device. More specifically, it concerns a expandable AC power supply device which can supply AC power for a load from batteries which are built into an uninterruptible AC power supply ("UPS") or into a portable AC power supply.

2. Description of the Related Art

An uninterruptible AC power supply device has a fixed AC power capacity and time for which it can provide backup. The user checks the AC power requirement of the OA device being used and for which backup power needs to be provided, and uses an uninterruptible AC power supply device which has the desired rating. A portable AC power supply is used when an electrical device (or load) is to be used outdoors, or in another place where it cannot be supplied directly from commercial AC power. The user charges the built-in battery ahead of time, and the battery supplies AC power to the load when the electrical device is used. Portable AC power supplies also are chosen so that their rating and capacity match the load.

Existing AC power supply devices of the type described above have several problems. For example, sometimes more OA devices are added or a device is upgraded after an uninterruptible AC power supply device has been selected and put into use, thus increasing the load which must be backed up. It is also possible that the calculation of the capacity was wrong to begin with, so that the uninterruptible AC power supply is unable to handle even the existing load. In these cases, the user finds that he must purchase a new uninterruptible AC power supply with a larger capacity. To obviate such problems, the user might choose to use a large AC power supply with more capacity than he needs. In either case, the solution is uneconomical. Also, since the size of an AC power supply increases with its capacity, using an AC power supply with a capacity which is higher than needed causes the entire unit to be larger than it needs to be.

Considering the AC power supplies which are actually available, it is clear that the range of capacities available is limited by the number of models produced. Since the increment in capacity from one model to the next will necessarily be a large one, many users have no choice but to select an AC power supply with a larger capacity than they need.

If a malfunction occurs in some part of an AC power supply, AC power cannot be supplied to the load even though the remaining capacity of the batteries may be sufficient to provide backup AC power. If such a malfunction occurs while the batteries are being used to provide backup AC power, an unforeseeable breakdown will occur which may cause damage to the load or lead to unit error.

SUMMARY OF THE INVENTION

One object of the present invention is to provide an AC power supply device with one or more of the following features: (i) the ability to be set up to provide an AC power capacity sufficient for, but closely matched to, the load being used; (ii) allowing the AC power capacity to be increased relatively simply to respond to an increased load demand when more electrical devices were added or the device is upgraded; (iii) minimizing the probability that a malfunction in some part of the device would interrupt the supply of AC power; and (iv) allowing AC power to be supplied to the load in a stable fashion.

In order to meet the objectives outlined above, among others, the expandable AC power supply device of this invention may comprise one or more AC power supply modules, each module comprising 1) one or more batteries, 2) a battery charger to charge the battery; 3) an AC power generator unit which inverts a electrical charge stored in the battery and generates an output AC power to the specified load; 4) a control unit capable of controlling an operation of the expandable AC power supply device; 5) an AC power supply plug to receive external AC power from external AC power source; 6) an AC power supply socket for the external AC power to connect to the AC power supply plug of an adjacent AC power supply module which may be connected side by side; 7) an AC power supply socket to output the AC power from the AC power generator unit; and 8) an AC connecting terminal to connect with the AC connecting terminal of the adjacent AC power supply module which may be connected side by side to transfer the specified AC power.

By connecting the AC power supply socket on one of the aforesaid power supply modules (or devices) to the AC power supply plug on another power supply device of the same configuration, and connecting the downstream signal connecting terminal on the aforesaid power supply device to the upstream signal connecting terminal on another power supply device of the same configuration, one can connect a number of the aforesaid power supply devices in parallel. In this way it is possible to supply power to match a specified load requirement by using one or more power supply devices.

A single AC power supply device can function independently as a complete power supply device, or, if two or more devices are connected in parallel, these connected devices can be used to form a complete power supply. In this case, the capacity of the AC power supply device will be the sum of the capacities of all the devices. A single device used independently can supply AC power to a small load; combining a number of devices provides a high capacity to supply AC power to a load. When the required load capacity increases because an additional device has been added or the device has been upgraded, a number of devices can be added which corresponds to the additional load. In this way it is simple to insure an adequate AC power supply capacity without using an excessively large and wasteful power supply.

BRIEF DESCRIPTION OF THE DRAWINGS

FIG. 5 (b) shows the configuration of a circuit which varies the output voltage in response to the battery voltage.

FIGS. 7 (a), 7 (b), and 7 (c) show output voltage characteristics with respect to discharge voltage to which batteries have been charged and their remaining capacity.

DESCRIPTION OF THE PREFERRED EMBODIMENTS

Figure 1A:
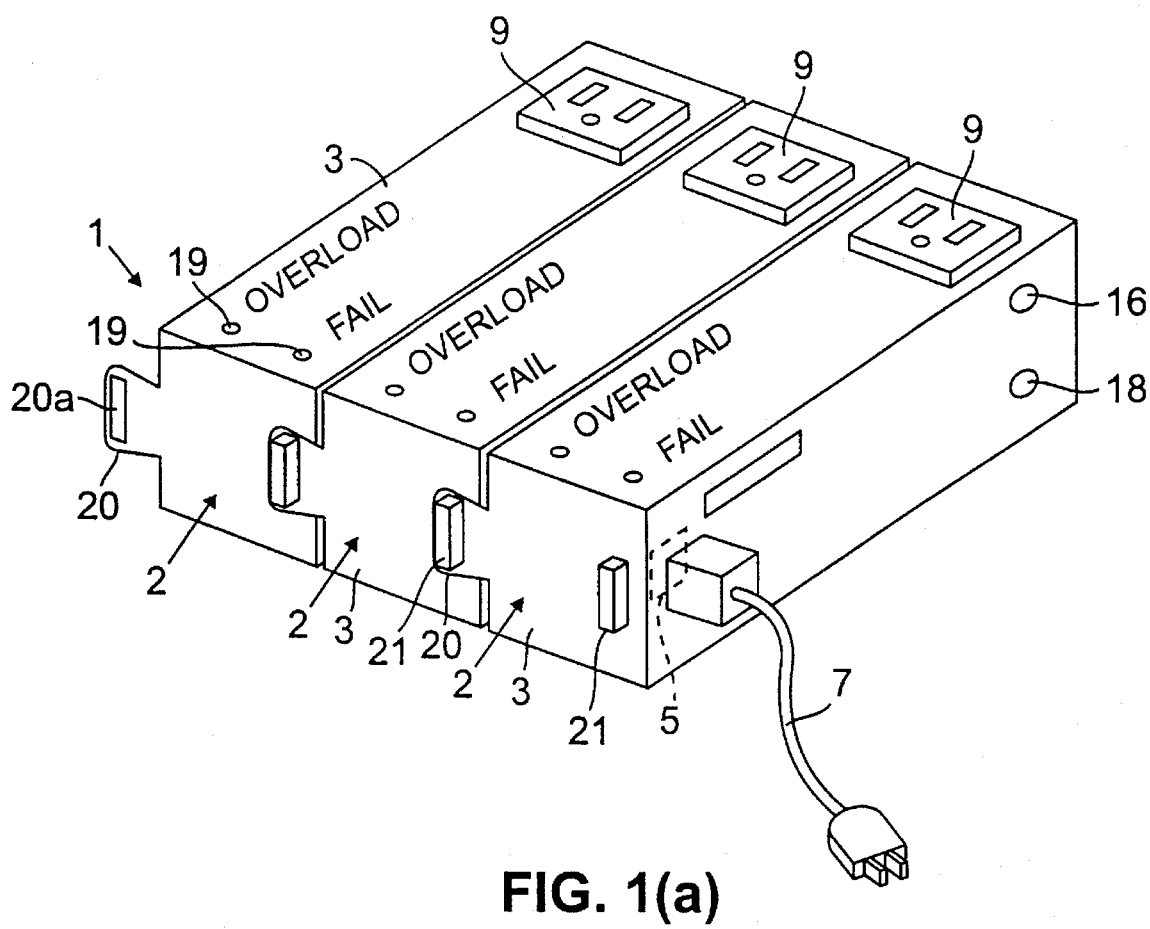
FIGS. 1 (a) and 1 (b) show an embodiment of an AC power supply device according to one aspect of this invention.
Figure 1B:
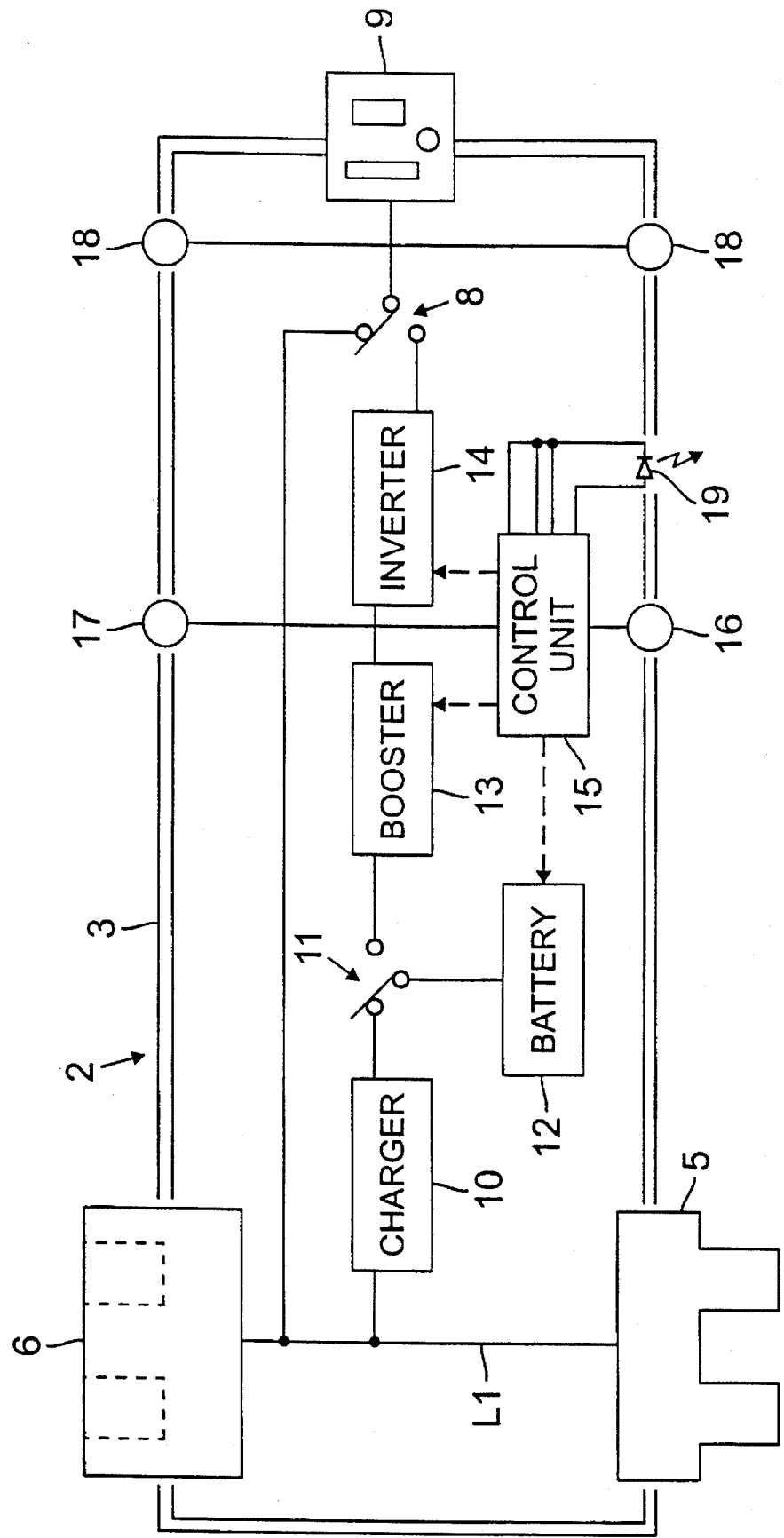

An embodiment of the power supply of this invention is discussed with reference to the appended drawings. FIG. 1 shows the first embodiment of this invention. In this figure, uninterruptible power supply system 1 is composed of a number of adjacent, discrete power supply devices 2 (or modules), which, as can be seen in the drawing, are connected in parallel.

Each power supply device 2 can itself function as an independent uninterruptible power supply (similar to those ordinarily available commercially). Each device 2 has an AC power supply plug 5 which supplies power from an external source, on one side of rectangular case 3. On the opposite side, as shown in FIG. 1 (b), it has an AC power supply socket 6, which serves as an AC power supply socket. AC power supply plug 5 and AC power supply socket 6 are connected inside case 3 to provide continuity.

When two or more devices 2 are connected together, the AC power supply socket 6 on one device is connected to the AC power supply plug 5 on the adjacent device, and AC input cable 7 is connected to the AC power supply plug 5 on the last device 2, as shown in FIG. 1 (a). Connecting a number of power supply devices 2 creates a common power supply path and makes it possible to supply power from an external power source (i.e., commercial power). When a number of devices are connected in this way, all the AC power supply plugs 5 except the last one are connected to connectors 6, so they are not exposed to the exterior. This makes it impossible to mistakenly connect an AC cable 7 to more than one AC inlet, thereby connecting more than one device to commercial power.

AC output terminals 9 for AC output can be connected via switch unit 8 to power supply paths $L_1$, which link AC power supply plugs 5 to connectors 6. That is, under normal circumstances, when there is no power outage, switches 8 are connected to paths $L_1$, and AC output terminals 9 for AC output are supplied with power directly from commercial power. AC output terminals 9 are located on the top of cases 3, as shown in FIG. 1 (a).

Within each power supply device, charger 10 is connected to the aforesaid power supply path $L_1$. Battery 12 can be connected to charger 10 via switch 11. That is, 10 and 11 are normally connected, and the charger is supplied from commercial power to charge battery 12. If there is a power outage, switch 11 is switched to booster 13, and power can be supplied to booster 13 from battery 12.

The output from booster 13 is connected to inverter 14, whose output is connected to the aforementioned switch unit 8. When the power is out, switch unit 8 is changed to connect inverter 14 to AC output terminal 9 for AC output. Booster 13 and inverter 14, then, comprise a power output circuit.

The processing required to operate switches 8 and 11, the control of-booster 13 and inverter 14, and the oversight of the condition of battery 12 are performed via control unit 15. Since these control operations are substantially the same as those used in an ordinary uninterruptible power supply, their explanation is omitted.

In this example, control unit 15 is linked to upstream and downstream signal connecting terminals 16 and 17, on opposite sides of case 3, in order to facilitate a specific kind of operation in which each device 2 is synchronized with the others. The control units 15 in each of two adjacent devices 2 can then be interlocked via signal connectors 16 and 17. Upstream signal connecting terminal 16 is located on the same side of the case as AC power supply plug 5.

Two sets of connectors 18 for AC output are provided on opposite sides of case 3. AC output terminal 9 for AC output is connected to terminal sets 18. Each terminal set 18 is connected to the connector for AC output on the adjacent power supply device(s) 2. In this way, the AC output terminals for AC output on all the power supply devices 2 are connected, so that power can be supplied not only from a single battery 12 but also from the batteries 12 in all the other devices 2.

Luminous elements 19, which are connected to control unit 15, are located on top of case 3, as shown in FIG. 1 (a). Based on the control signal from control unit 15, the state of the load can be determined, i.e., whether there is an overload, and the condition of battery 12, i.e., the result of the battery check, which is an evaluation of how much life is left in the battery, and which may indicate that the battery has badly deteriorated or that some abnormality has occurred.

Tab openings 20, each of which has a long slot 20a cut in it, and tabs 21, which engage in these slots, are on the two opposite sides of case 3 where there are no terminals. When a number of power supply devices 2 are connected, as shown in FIG. 1 (a), the tab openings 20 of one device 2 extend over the sides of the adjacent device 2 so that tabs 21 of that device engage in their slots. This arrangement prevents any power supply device 2 from separating from the next device while the power supply is in use.

A fundamental principle underlying the operation of this embodiment is now discussed. When a single power supply device 2 is used as an independent uninterruptible power supply, AC input cable 7 is connected to AC power supply plug 5 on that device 2. When this AC input cable 7 is connected to the commercial power source, commercial voltage AC is supplied to power supply path $L_1$. The aforesaid AC is output to AC output terminal 9 via the direct circuit (the route from power supply path $L_1$ through switch unit 8). At this time battery 12 is charged via charger 10.

When a power outage occurs under these circumstances, the outage will be sensed by a commonly used sensor unit in control unit 15, and switches 8 and 11 will be switched. This causes the battery 12 to supply power to booster 13, where the voltage is boosted. The boosted DC voltage is supplied to inverter 14, which is the next stage, where it is converted to AC. It is then supplied to AC output terminal 9 for AC output by way of switch unit 8. By this process the power supply is backed up.

Discussed next is what transpires when a number of power supply devices are connected to create uninterruptible power supply device 1. A specified number of power supply devices 2 (in this case, three) are lined up side by side. The AC power supply plug 5 of one device 2 is connected to the connector 6 of the adjacent device 2, the upstream signal connecting terminal 16 of one to the downstream signal connecting terminal 17 of the adjacent device, and the output AC connecting terminal 18 of one to the AC connecting terminal 18 of the adjacent device, resulting in the configuration pictured in FIG. 1 (a). When AC input cable 7 is connected to a commercial power supply, AC is supplied to the power supply path $L_1$ in each power supply device 2. Accordingly, AC is directly supplied to the AC output terminal 9 in each device 2, thus enabling power to be supplied to the load.

When a power outage occurs under these circumstances, the battery 10 built into each power supply device 2 is discharged according to the same principle as with a single device, and backup power is supplied to each AC output terminal 9 for AC output.

In this example, all AC output terminals 9 are connected via AC connecting terminals 18. Therefore it is possible to add or remove output capacity in portions corresponding to the capacity of each battery 12. If there is, say, a single load, to which power is supplied by three batteries 12 connected in parallel, to supply power to a higher-demand load, the number of AC power supply devices 2 which are connected can be increased. It would also be possible to connect a different OA device to each AC output terminal 9. In this case, it would be advisable to connect a number of devices 2 sufficient to yield a capacity just larger than the total demand of the loads of all the OA devices which are connected. Then, once an uninterruptible power supply device has been assembled, an increase in the number of loads connected for the OA devices or an increase in a particular load due to the modification of one of the devices can be addressed merely by increasing the number of devices 2.

If some of the power supply devices should malfunction during backup, and the batteries in the remaining devices are sufficient to handle the capacity of the load, the load will be supplied with power from the properly functioning devices. The malfunction of some of the devices, in other words, does not necessarily mean that the power supply will not be backed up.

When, as discussed above, a number of devices 2 are connected to form uninterruptible power supply 1, the AC output of the inverter 14 in each device 2 is supplied to the AC output terminal 9 of that device. This makes it necessary to synchronize the timing of the switching for backup as well as the output waveforms. The processing required for synchronization is performed by interlocking the operation of all the control units 15. More specifically, in this example one of the control units 15 is selected to be the master, and the other control units 15 control the operation of the components under them based on a control signal (through state) from the master unit.

Thus each control unit 15 must sense whether the uninterruptible power supply consists of a single independent power supply device or of a number of devices connected together. If it does consist of a single device, that device is controlled independently, as described above. If it senses that a number of devices are connected, it must then sense whether or not it is the master. If it is, it transmits commands to control every part of its own device and the other power supply devices, either directly or indirectly, i.e., through another control unit. If it is not the master, it performs its processing according to command signals it receives from the master control unit. In this example, the control unit 15 in the power supply device 2 to which AC cable 7 is connected has been selected to be the master.

Figure 2:
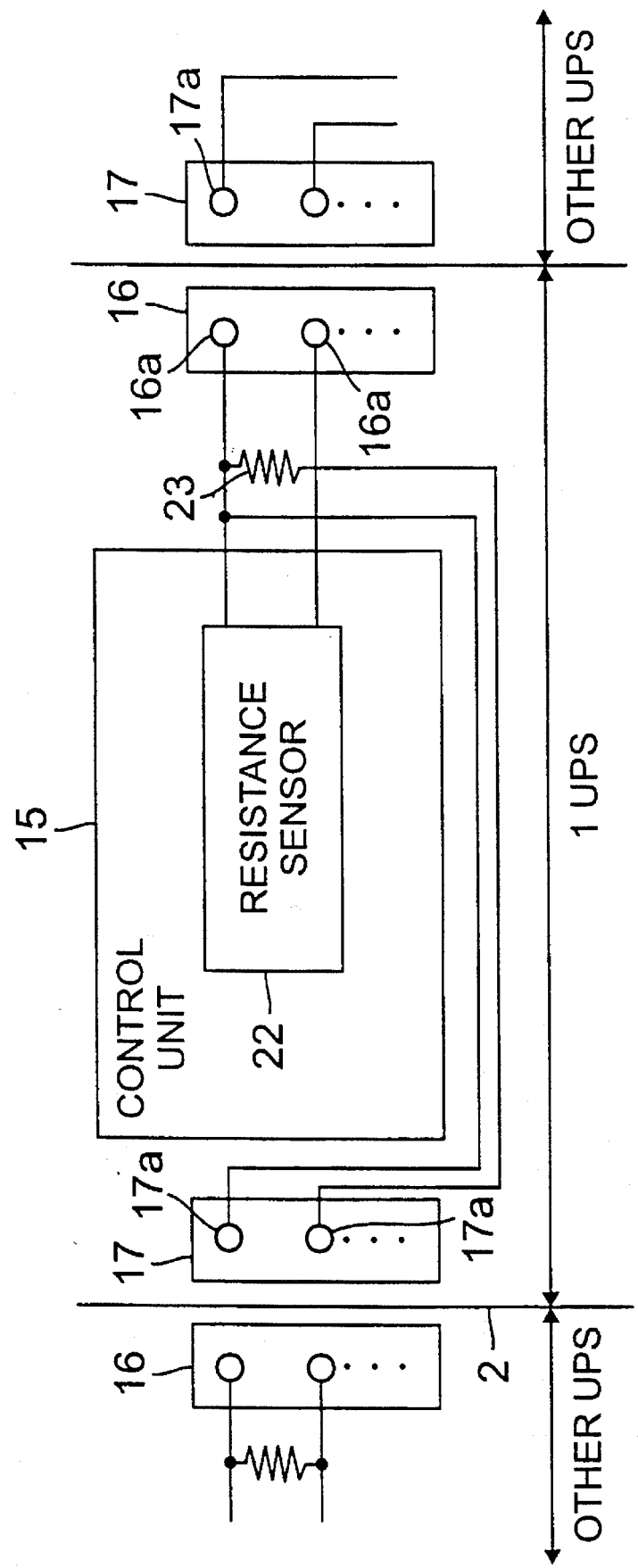
FIG. 2 shows the configuration of the circuit which determines whether the device is operating independently or in combination with other devices.

To provide the various decision mechanisms referred to above, there is, as shown in FIG. 2, a sensor unit 22 in control unit 15 to sense resistance values. In addition, resistor 23 (resistance value R) is connected between pins 16a on upstream signal connecting terminal 16. The resistance value between pins 16a is measured by the aforesaid sensor unit 22. The aforesaid pins 16a are led through to the corresponding pins 17a on downstream signal connecting terminal 17.

When a power supply device with this configuration is used independently (i.e., when it is not connected to another power supply device), the resistance value sensed by sensor 22 will be the resistance R of resistor 23. When a number of devices 2 are connected to each other, a number of resistors 23 equal to the number of devices 2 will be connected in parallel, and the resistance value which is sensed will be less than half that of a single independent device. When the value sensed by sensor 22 is processed using a prescribed value (a selected value between R and R/2) as a threshold, it can be determined whether or not the associated power supply device is operating independently.

When a number of devices are connected to each other, each must sense whether it is the master. If, for example, the power supply device 2 to which AC cable 7 is connected is the master, its upstream signal connecting terminal 16 will be open. The control unit 15 of each power supply device 2 senses whether its terminal 16 is open. If it is, it recognizes that it is itself the master unit. If terminal 16 is not open, it is not the master, so it awaits a command signal from the master in order to operate. A judgment as to whether terminal 16 is open can be made easily if two specified pins on connector 16 are designated as judgment pins and a specified resistance is connected through the judgment pins and connected to the corresponding pins on downstream connecting terminal 17.

To process the various judgments discussed above, specified pins on connectors were used. Another possibility would be to have a proximity switch (a limit switch) in a specified location on case 3. Such a switch could sense the presence of another power supply device which is connected to the first. Various other schemes would also be possible. The master control unit need not be the one in the power supply device to which AC cable 7 is connected, as in this example. Any of the control units in the connected power supply devices could be selected as the master.

synchronizing the Output Waveform

It is important to synchronize output waveforms and control of the timing of switching, which are functions of the master control unit 15, determined as described above. First of all, since in this example power is supplied for a single load by the batteries 12 (or inverters 14) of a number of power supply devices 2, the output waveforms of all the inverters 14 must be synchronized. In this example, a sine wave generator (not pictured) is built into the control unit 15 of each power supply device 2. Each inverter accepts the output of the sine wave generator and thereby converts the direct current into alternating current. The sine wave generator is driven based on a timing signal (50 or 60 Hz) to coordinate the zero crossing point which is transmitted by the master control unit 15. In this way the inverter 14 of every device 2 is driven synchronously according to a control signal from a single control unit 15, i.e., the master unit, and the device operates in a stable fashion.

When using this configuration, there is effectively no noise or phase shift, even when a large number of devices are connected. Ordinarily, when only a few devices are connected and the effect of noise is minimal, a pulse-width modulation ("PWM") signal could be supplied in parallel to each power supply device by the master control unit 15. However, as the number of devices increases, the distance over which the PWM signal must be communicated grows longer, and noise and phase shift are more likely to affect the device.

Control to Prevent Shift in Switching Timing

If relays are used for the aforementioned switch unit 8, their timings will be subjected to varying shifts of 3 to 8 ms. It is possible, then, for there to be moments when one power supply device 2 is connected to inverter 14 while another device 2 is connected to the direct circuit. When this occurs, there will be a flow of reverse current in the current of inverter 14, which may result in a malfunction.

Figure 3A:
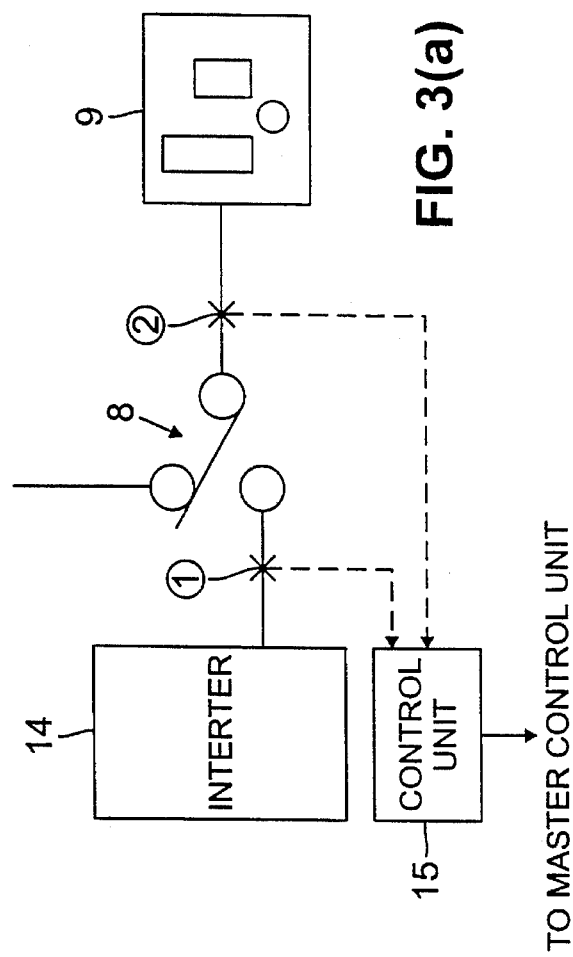
FIGS. 3 (a) and 3 (b) illustrate how the timing of switching is controlled.
Figure 3B:
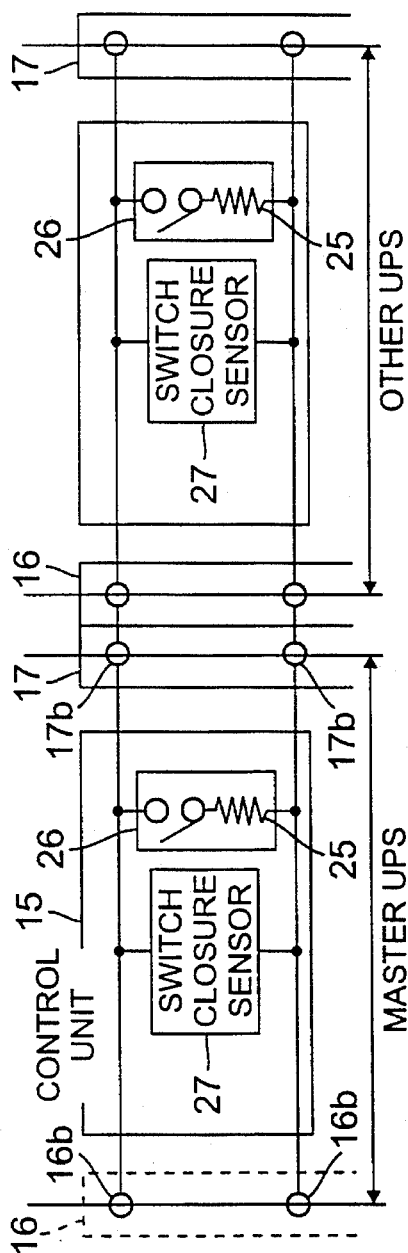

In this embodiment, as shown in FIG. 3 (a), a resistance value sensor in control unit 15 (not the same as resistor value sensor 22 pictured in the aforesaid FIG. 1) senses the resistance value on both sides of switch unit 8, between the output side (1) of inverter 14 and the input side (2) of AC output terminal 9 for AC output. When points (1) and (2) are both shorted (i.e., when the switch is closed), the resistance value becomes immeasurably small. When the switch is connected to the direct circuit (i.e., when the switch is open thereby connecting the output terminal 9 to the power supply path $L_1$), the resistance value becomes infinitely large.

When the switches are closed, a signal is sent to master control unit 15 indicating that switching has been completed. Master control unit 15 then confirms that the switching procedure has been completed for switch unit 8 in every power supply device 2. It then sends a "commence operating" command to the inverter 14 in every device 2. This prevents inverter 14 from being connected to the direct circuit (and hence to the commercial power source) while the power supply is operating, so that the current flow will not be reversed.

The actual circuit which senses when switching has been completed in every power supply device 2 (i.e., when every switch unit 8 is closed) is shown in FIG. 3 (b). Resistor 25 (with resistance value R) is inserted between two specified pins, 16b and 17b, on upstream and downstream signal connecting terminals 16 and 17 respectively. The circuit detects that the switch is closed when contact 26, which is connected in series with respect to resistor 25, is closed.

Switch closure sensor 27 in master control unit 15 obtains the resistance value of the resistors connected in parallel and determines whether this value is equal to a specified value. In this way it can sense when the switch unit 8 has closed in every power supply device 2. When the switch has closed in every device 2, all the resistors 25 in all the devices 2 will be connected in parallel, and the calculated resistance value will be R/N, where N is the number of devices connected.

In this example, the aforesaid resistor 23, which senses whether one or several power supplies are being employed, has the same resistance value as resistor 25. Thus the values sensed by sensors 22 and 27 will be identical. Sensor 27 is supplied with the value obtained by the sensor 22 in the same control unit 15. When the value which sensor 27 has itself calculated is equal to this value from sensor 22, it concludes that switching has been completed (i.e., switch unit 8 is closed) in every device 2. This scheme of calculating and comparing the resistance values affords a quick and reliable method of controlling the device.

If there is a malfunction in one of the power supply devices which are connected, the aforesaid switch unit 8 will not be switched nor will contact 26 be closed. Sensor 22 determines the measured resistance value according to the number of devices connected, without reference to possible malfunctions. Even if the switches in all the power supply devices which are operating properly are closed, the value sensed by the sensor 27 will be different from that obtained by sensor 22.

To determine both whether a number of devices are connected and how many there are, a contact (not pictured) can be inserted in series with resistor 23 which will open in the event of a malfunction. In this case the resistor 23 in the malfunctioning device will be cut off from resistance sensor 22, which can then sense when switching has been completed in all the power supply devices which are operating normally.

Adjusting the Output Current

Figure 4:
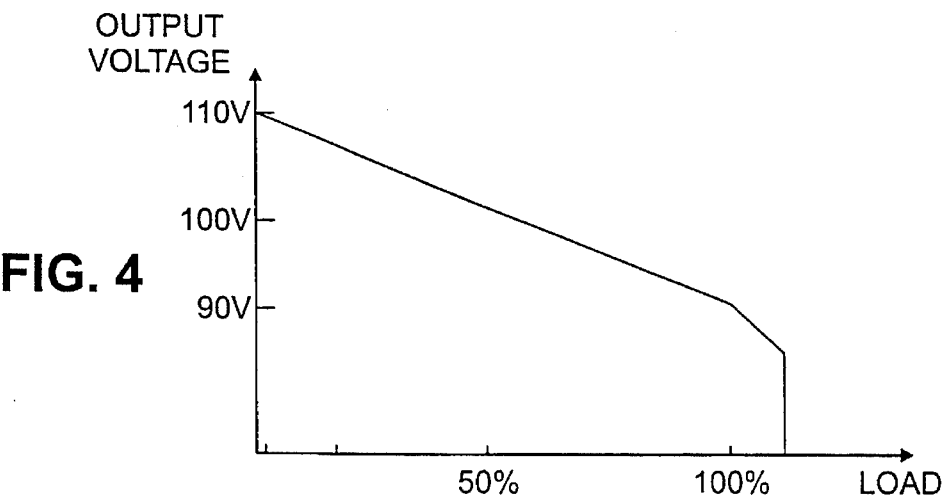
FIG. 4 is a graph of output voltage characteristics with respect to imposed load.

If the output voltage of every power supply device 2 were fixed, it could happen that the portions of the load handled by each device were unequal, and the battery in one or another device could rapidly be exhausted. In this embodiment, the output characteristics of inverter 14 with respect to load are shown in FIG. 4. Because of this characteristic, the load is apportioned appropriately between any two power supply devices 2, and every device can operate in its optimal state.

This means that as the load demand of a given device 2 increases, the output voltage will drop. When the load imposed exceeds a fixed value (105%), output will be halted to protect against overload, just as in conventional power supplies. Output voltage is controlled by each control unit 15, which senses the load demand imposed on its associated power supply device and adjusts the output of inverter 14 and the gain factor of booster 13. This type of output voltage characteristic will supply the proper voltage AC±10% for each OA device which acts as a load, so there is no problem in regard to voltage regulation.

With this configuration, the output voltage of a power supply device 2 on which a small portion of the load is currently imposed will be increased (the current value will be increased). Thus its output voltage will exceed that of the other devices 2, and the portion of the total load imposed on it will increase. The output voltage of a device 2 on which a large load is currently imposed will be decreased (the current capacity will be decreased), and the portion of the total load which is imposed on it will decrease. In this way the load imposed on each power supply device 2 in the device can be apportioned according to the capacity of that device, and the current can be shared easily. Since the control unit 15 in each power supply device performs this control based on its own operating state, there is never a need to adjust or control one device with respect to another.

Adjusting Output Voltage

When a number of power supply devices are connected, current sharing and different battery capacities may cause there to be vast differences between the times it takes the various devices to be completely discharged. If the load were apportioned equally to each device, the rate at which the load is imposed on a given device would be effectively higher with respect to the remaining capacity of that device as the time of complete discharge approached. The device would be discharged more rapidly and the supply of power would cease in a shorter time.

Figure 5A:
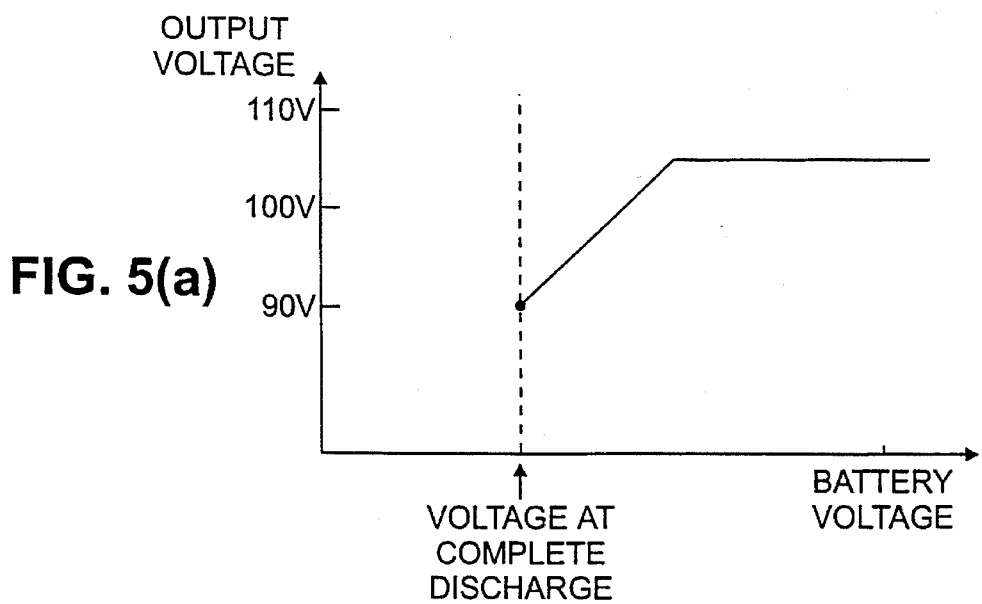
FIG. 5 (a) is a graph of output voltage characteristics with respect to the voltage to which batteries have been charged.
Figure 5B:
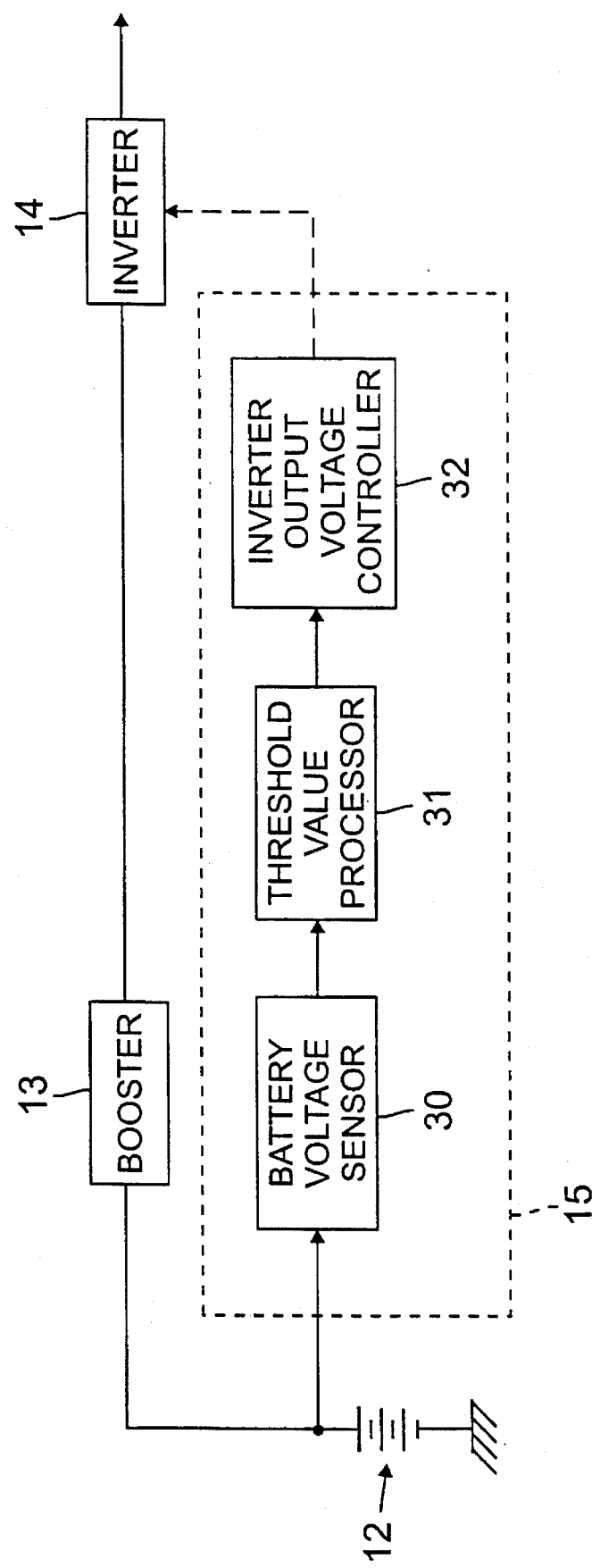

The output voltage characteristics of inverter 14 in this embodiment are shown in FIG. 5(a). As long as the battery still has sufficient capacity, output voltage is set at 105 V (100% of capacity). As complete discharge approaches, the output voltage is decreased. The actual configuration of components which perform this task is pictured in FIG. 5

(b). Voltage sensor 30 senses the voltage between the terminals on battery 12. The voltage which is sensed is sent to the next stage, processor unit 31, where a judgment is made as to whether that voltage is greater than a threshold value (a voltage corresponding to 100% of output voltage (105 V)). The result of this judgment is sent to the next stage, control unit 32. If the battery voltage is below the threshold value, the control unit continues to output the same value. If it exceeds the threshold value, the control unit outputs a voltage at an inverse proportion of that value. When the battery voltage decreases, then, the output voltage is held constant; and when the voltage exceeds a threshold value, an inverse proportion of that value is output. In this way the battery voltage suppresses the output voltage only to the extent that it is high. As a result, the final output of inverter 14 is stable. In this embodiment the output of the inverter is controlled, and the same result is achieved even if the boost factor is changed.

As completion of discharge nears in a particular device, the portion of the load imposed on it is smaller. Since the amount of discharge per device time is smaller, it will take longer to completely discharge the device. Thus every power supply device 2 is used at an equal fractional rate, and every battery will be completely discharged at about the same time. In this way the capacity of each device can be put to the best use. Because the state of the battery in each device 2 is sensed and the apportionment of the load adjusted automatically, the load need not be adjusted or controlled with respect to that of the other power supply devices.

An analogous situation arises with respect to differences between devices in how much their batteries have degraded. A device which is fully charged will degrade if used for a long time with a new device, resulting in different periods of backup capacity. If the load demand is increased after a fixed period of use and a new device 2 added, the batteries will differ greatly in their degree of degradation (and so in their remaining capacity). When this occurs, the backup capacity of the uninterruptible power supply as a whole would ordinarily be determined by the capacity of the device whose battery is most degraded.

Figure 6:
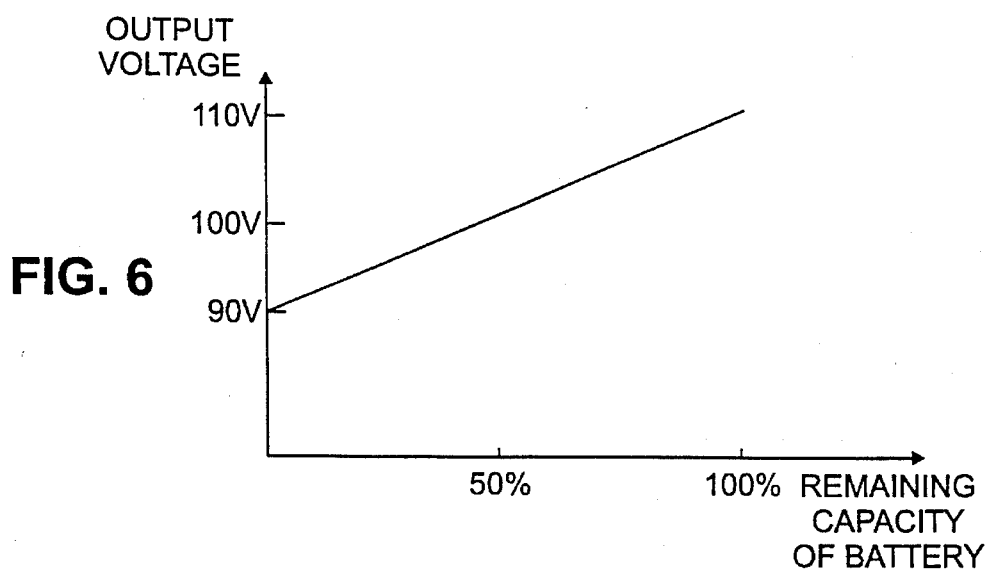
FIG. 6 is a graph of output voltage characteristics with respect to remaining capacity of batteries at full charge.

FIG. 6 shows the characteristics of the output voltage with respect to the remaining capacity of battery 12. The greater the remaining capacity, the higher the voltage output. When the capacity decreases, the output voltage is also decreased, and a lighter load is imposed, thus curtailing the rate at which electricity is discharged. The remaining capacity indicates the degree of degradation, which refers to the backup time the battery is currently capable of providing when fully charged as opposed to the backup time it is capable of in its fully charged state when it is new. The remaining capacity is sensed in each device 2 prior to its use by its battery checking function (which informs the user when it is time to replace the battery), and the value is stored.

One method of implementing that function is to store a table of output voltages with respect to remaining capacity. The necessary output voltage would be determined from the current capacity, and the output voltage of the inverter would be adjusted to yield the desired voltage.

It is also possible to combine adjusting the output voltage with respect to the remaining capacity with adjusting it based on the output voltage of the battery. In this case, as shown in FIGS. 7 (a), 7 (b), 7 (c), the threshold value where the output voltage is to be fixed is set at the output voltage determined by the remaining capacity (i.e., determined according to the characteristics pictured in FIG. 6). When the battery voltage drops below this threshold value, the output voltage is decreased accordingly. A circuit to achieve such characteristics could easily be realized if the threshold value which is a reference for comparison in the processor unit shown in the block diagram in FIG. 5 (b) is made variable. This threshold value is then varied according to the remaining capacity which is sensed.

Battery Checking Function

The aforesaid battery check is performed by inducing a virtual power outage so that the power supply goes into its backup state (i.e., switches 8 and 11 are switched). The condition of each battery is sensed from the drop in battery voltage at this time. When the evaluation has been completed, the power supply is returned to its normal state (i.e., power is supplied via the direct circuit).

In this embodiment, the aforesaid battery check is performed automatically at specified intervals (about once a month). The master control unit 15 sends a control signal which acts as a trigger, and the control unit 15 in each of the other power supply devices 2 switches its device to backup state and evaluates how much the battery has degraded (or how much capacity remains). When it has completed its evaluation, it sends an "evaluation completed" signal to the master control unit 15. When the evaluation has been completed, but the processing to return to normal state (in which power is supplied via the direct circuit) has not yet been performed, the power supply stands by. When an "evaluation completed" signal is received from every other device 2, the master device 2 sends each of them a "return to normal" signal as a trigger. In response to this signal, the control unit 15 in each device 2 returns switches 6 and 11 to their original state to complete the direct circuit. This is the normal state, in which power is supplied from commercial power.

Since the battery check and the switching process are carried out in communication with each control unit 15, there is no danger of power being supplied from a battery and the commercial power at the same time.

Overload Display

As was mentioned earlier, each power supply device 2 has on its top surface an indicator including a luminous element 19, which may be ordered to flash by the control unit 15. The current flowing in the direct circuit is sensed by a current transformer or the like. If the current which is measured exceeds a given value, luminous element 19, the overload indicator, is lighted. The operation of the indicator can be controlled by a command from the control unit 15 in each device 2. When a single power supply device 2 is used independently, it senses an overload in the usual way and causes luminous element 19, the specified indicator, to light up.

When several devices are connected together, the length of the wiring path may cause the value of the current flowing in one device 2 to differ from that in the next, so that the luminous element 19 of one device lights up to indicate an overload even though the indicators on the other devices are off. For example, if the load is connected to AC output terminal 9 on the master power supply device 2, the further away from the master a device is, the longer its wiring path will be, and the lower its measured current value will be.

Figure 8:
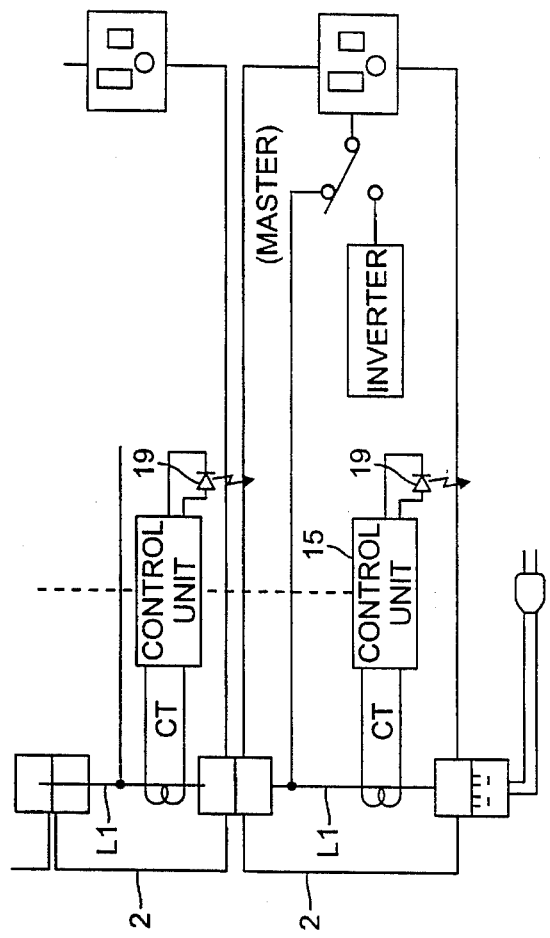
FIG. 8 shows an arrangement to provide overload control.

In this embodiment, there is a current transformer CT on every power supply path $L_1$, as shown in FIG. 8. Master control unit 15 receives the value which is measured by its own current transformer CT, which serves as the overload sensor. It determines whether this value exceeds the allowable power of the device as a whole. If it does, the control units 15 in all the devices 2 cause their luminous elements 19 to light up. In this way the indicators on all the devices are made to agree.

Because the capacity of each power supply device 2 is known, the aggregate allowable power may be determined by multiplying the capacity of each device 2 by the number of devices connected, which is obtained from the output of the aforesaid sensor unit 22, the unit which senses a resistance value. This aggregate allowable capacity is calculated by the master control unit 15.

Limitation on Number of Devices Connected

Figure 9:
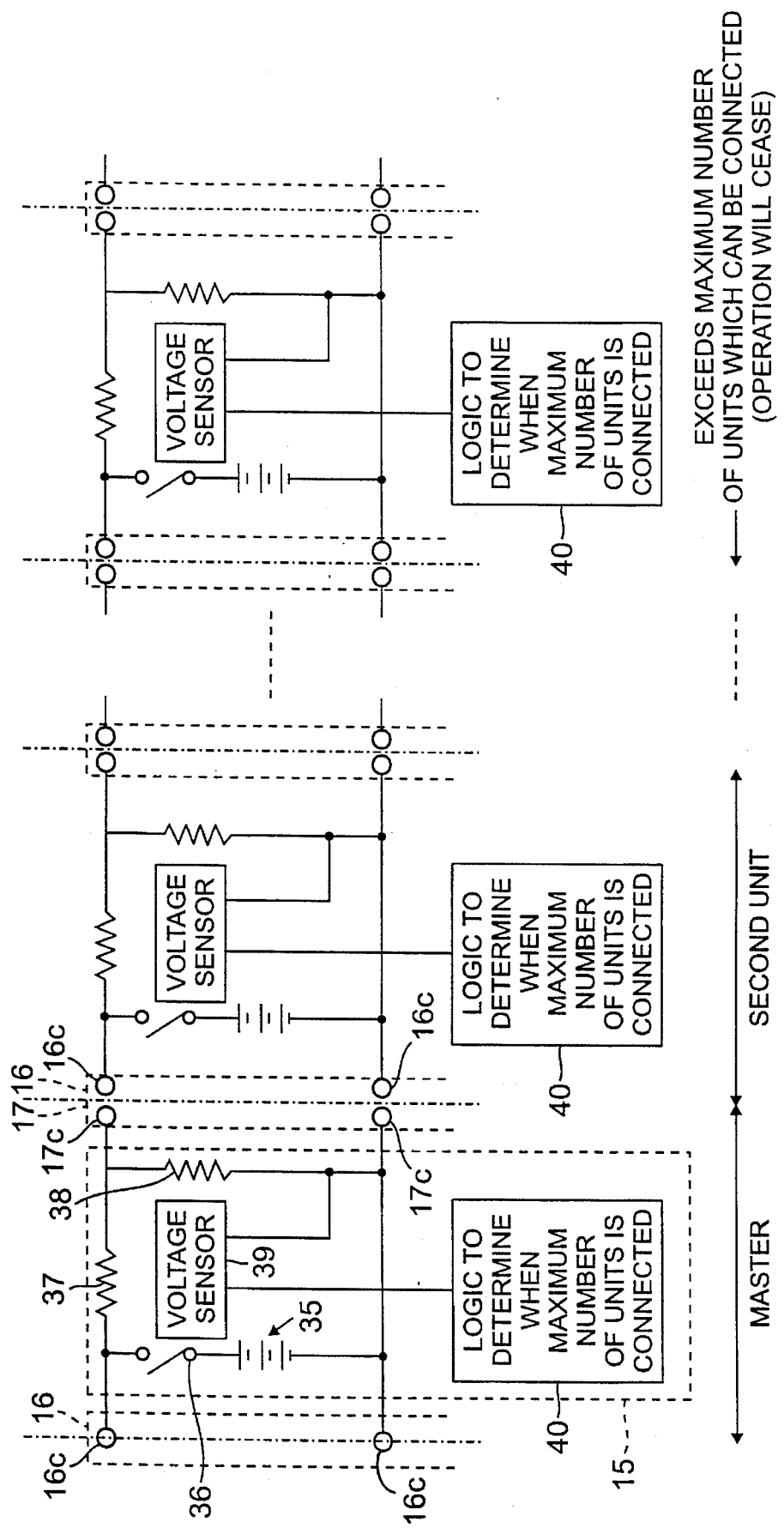
FIG. 9 illustrates a mechanism which limits the number of devices that can be connected.

If an unlimited number of power supply devices were allowed to be interconnected, the limit value of the allowable current into AC power supply plug 5 would be exceeded, and unstable operation might result. In this embodiment, there is a sensor circuit (pictured in FIG. 9) to guarantee that the AC power supply plug 5 which is used operates as rated and in a stable fashion. This closed circuit has, for each power supply 35, a contact 36, a resistor 37 (with resistance value $R_1$) and a resistor 38 (with resistance value $R_2$) connected in series. The two terminals of the series circuit including the power supply 35 and contact 36 are connected to pins 16c on upstream signal connecting terminal 16. The two terminals of resistor 38 are connected between pins 17c on downstream signal connecting terminal 17. Voltage sensor unit 39, the unit in control unit 15 which determines the maximum number of devices which can be used, senses the voltage across the two terminals of resistor 38. The output of sensor unit 39 is sent to unit 40, which determines when the maximum number of devices are connected. Unit 40 determines whether or not its own power supply device can be connected. If, based on the result of this judgment, its own device cannot be connected (because the maximum allowable number of devices would be exceeded), the device will not operate, and the luminous element 19 marked "Fail" will light up to indicate that too many devices are connected.

Although only the contact 36 in the master control unit 15 closes, this causes every sensor unit 39 to measure the voltage between the terminals of resistor 38. Assuming the voltage of power supply 35 is "E," and setting $R_1$ and $R_2$ to appropriate values, the measured voltage of the master unit will be E/2, that of the second unit E/4, that of the third E/8, that of the fourth E/16, and so on.

If, for example, the maximum number of devices which can be connected is three, unit 40 will determine whether the measured voltage value which it has received is less than E/8. If this value is greater than E/8, unit 40 will conclude that more than three devices are connected.

It would also be possible to provide a (normally open) contact connected to resistor 37 in parallel and a (normally closed) contact connected to resistor 38 in series. These contacts would then be switched in the event of a malfunction. With this configuration, the resistors in the malfunctioning device would be electrically separated from the circuit, so only the properly operating devices would be counted to determine when the maximum number of devices were connected. Any devices which exceeded that number would not operate.

Auxiliary Battery

Figure 10:
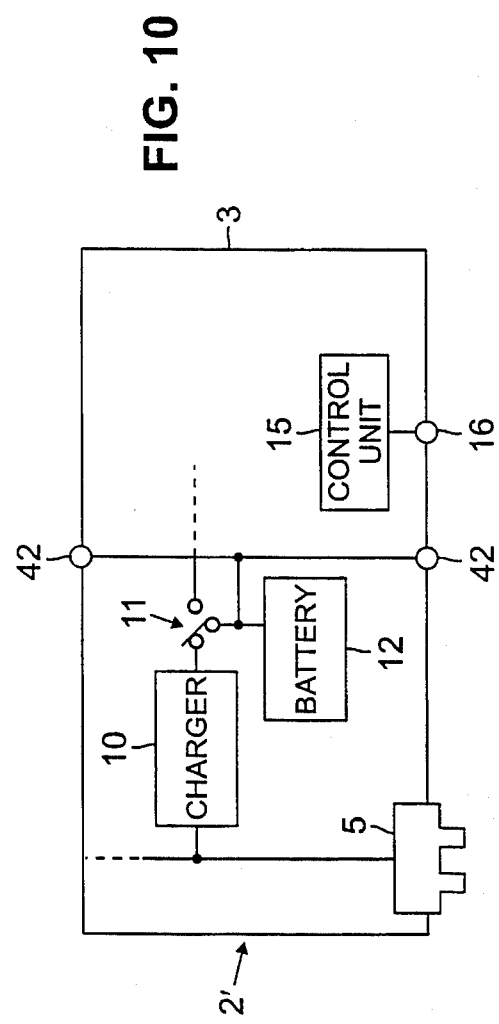
FIG. 10 shows an example of how an AC power supply device might be formed from a number of devices of which at least the battery is provided as a separate unit.

FIG. 10 shows an embodiment to which an auxiliary battery can be connected to extend the backup life of the power supply. In this figure, power supply device 2' has two battery connectors 42. When a number of devices 2' with such a configuration are connected, all the batteries 12 are directly connected in parallel through connectors 42. If a power supply device 2' is connected to an auxiliary battery unit (not pictured), the auxiliary battery unit will have two connectors 42 in specified positions on the sides of its case, to which the battery inside the case is connected. Thus the battery 12 in the power supply device 2' and the battery in the auxiliary device are connected in parallel. The capacity and the backup time increase with the number of auxiliary batteries. Only those components specifically relevant to this embodiment are pictured in FIG. 10. All other components are substantially the same as those pictured in the embodiments and modifications in FIG. 1 and the other drawings.

Partitioning the Devices

Figure 11:
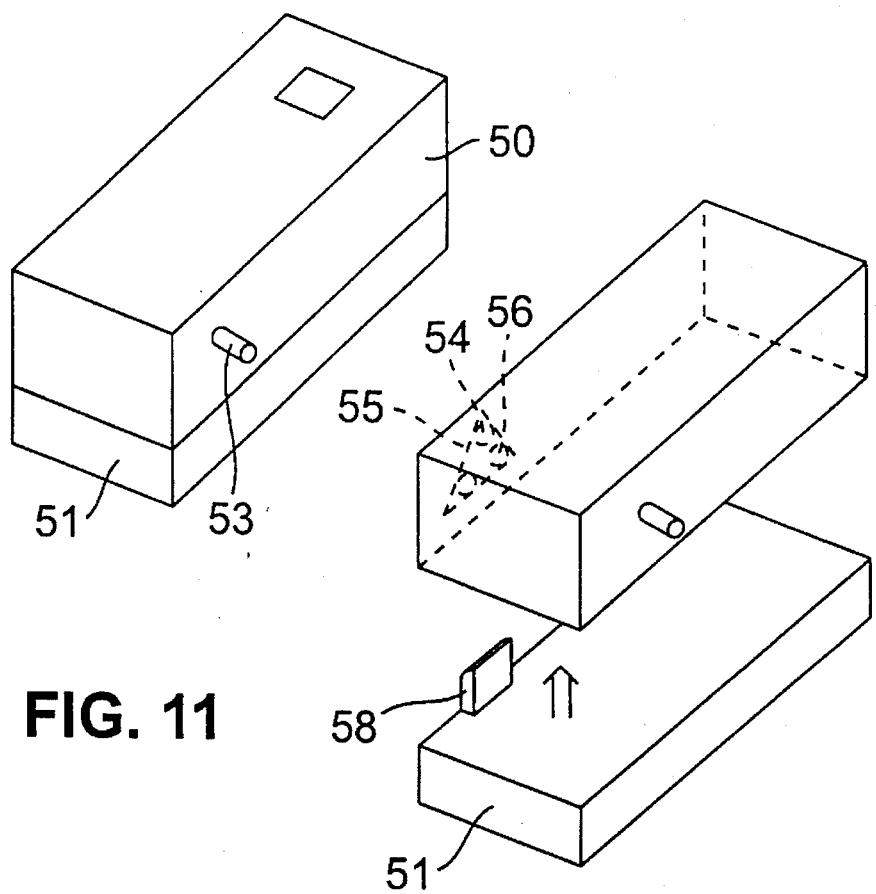
FIG. 11 shows an example of how a power supply device might be formed from a number of units of which at least the battery is provided as a separate unit.

FIG. 11 shows yet another ideal embodiment of this invention. This embodiment differs from those discussed previously in that the battery is in a device which is mounted externally. In the example which is shown, battery unit 51 is connected to the bottom of main circuit unit 50. When battery unit 51 is connected, the circuits shown in FIG. 2 are formed. This makes it easier to replace the battery once it has deteriorated.

Another feature of this embodiment is that the design makes it impossible to connect other power supply devices (i.e., other main circuit units 50) from being connected if battery unit 51 is not attached. This is to prevent the user from forgetting to attach battery unit 51.

As shown in FIG. 11, every main circuit unit has, in corresponding locations on the two sides which come in contact when the units are connected, a pin 53 and a hole 54. When two adjacent units 50 are connected, the pin 53 of one goes into the hole 54 of the other.

On the inside of the case, in the same location as hole 54, fan-shaped shutter 55 is mounted so as to be able to swing open and shut. Shutter 55 also has a hole, 56, in a specified location, which is virtually the same shape as the hole 54. When shutter 55 arrives at a specified point in its rotation, holes 54 and 56 are aligned to form a passage. In all other positions (positions which the shutter takes when unit 50 is used without battery unit 51 attached), hole 54 is blocked by shutter 55.

Battery pack 51 has a tooth 58 in a specified location on its top surface. When battery pack 51 is attached to main circuit unit 50, tooth 58 sticks up into the interior of unit 50, hits the aforesaid shutter 55, and forces it upward. This causes shutter 55 to swing into the position in which holes 54 and 56 are aligned.

It is thus mechanically impossible to connect a main circuit unit 50 while its battery unit 51 is not connected. This prevents the situation in which the backup capability is unavailable because the unit is used without its battery 51 and shifted into backup processing.

Figure 12:
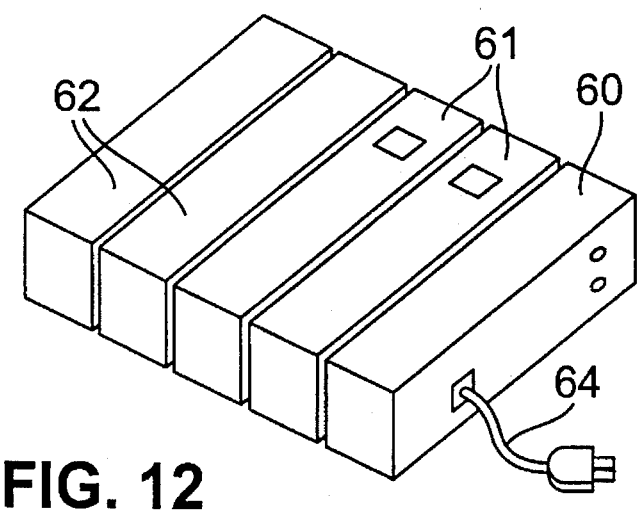
FIG. 12 shows an example of how a power supply device might be formed from a number of units of which at least the battery is provided as a separate unit.

FIG. 12 shows yet another embodiment of this invention. This is an expanded version of the third of the embodiments discussed earlier. It includes a control unit 60, which houses the control components; an inverter unit 61, which contains the circuitry for the inverter, the booster and the charger and has an AC output terminal for AC output; and a choice of three types of battery units 62, each of which has a built-in battery. By connecting the requisite number of devices, the user sets up a power supply device and constructs an uninterruptible power supply device. A detailed drawing of each unit is not provided. As in the other embodiments discussed earlier, the devices are connected via connectors furnished on their sides, through which power is supplied and control commands are communicated. Item 64 in the figure is the AC cable.

In all of the other embodiments discussed above, each power supply device has its own control unit; however, since the control units other than the master function basically as through lines, those control units are not put to full use when many power supply devices are connected. In this embodiment, therefore, the user can select the devices appropriate for his needs. There are no unnecessary components, and each user can assemble an uninterruptible power supply with a configuration suited to the environment in which it is to be used.

All of the embodiments discussed above were used to explain uninterruptible power supplies. However, this invention is not limited to such an application, but can also be applied to various other types of power supply devices with built-in batteries, such as portable power supplies.

As discussed above, the power supply device which this invention concerns can supply power to a small load when one power supply device is used independently; or it can supply power to a large load when a certain number of devices are used in combination. That is to say, the number of devices can be used which has a power capacity sufficient to handle the load being used. Additional devices can be added if the load demand increases because another electrical device is added or the device is upgraded, and the power capacity can be increased in a relatively simple fashion. If one of the power supply devices malfunctions, power will continue to be supplied as long as the aggregate capacity of the remaining devices exceeds the demand of the load. When output voltage and current are adjusted optimally, power can be supplied to the load in a stable fashion. When one of a number of connected devices malfunctions, that device can be removed and repaired. If at that time the aggregate capacity of the remaining devices exceeds the load demand, the power supply can continue to be used just as it is. That is, the power supply can be used while the faulty device is being repaired without replacing that device.

Although only a few embodiments have been described in detail above, those having ordinary skill in the art will certainly understand that many modifications are possible in the preferred embodiment without departing from the teachings thereof.

All such modifications are intended to be encompassed within the following claims.

What is claimed is:

1. An interconnectable power supply module comprising:
    a battery;
    a battery charger operating to charge said battery;
    a power generator operating to convert an electrical charge stored in said battery to generate output power for an external load;
    a power supply plug for receiving external power from an external power source;
    a power supply socket configured to couple the external power received from the external power source to an adjacent power supply module;
    an external load output socket on which output power is supplied to the external load from one of the external power source and said power generator; and
    a connecting terminal selectively coupling the external load output power to the adjacent power supply module.

2. An interconnectable power supply module according to claim 1, wherein said output power is AC power.

3. An interconnectable power supply module according to claim 1, further comprising means for detecting an external power source outage, and means for connecting said external load output socket to said power generator during said external power source outage.

4. An interconnectable power supply module according to claim 1, further comprising a control unit in said power supply module which operates to control operations of a plurality of power supply modules.

5. An interconnectable power supply module according to claim 4, further comprising:
    a downstream signal connecting terminal operating to couple a control signal from said control unit to an adjacent power supply module disposed at a downstream side; and
    an upstream signal connecting terminal operating to couple a control signal from said control unit to an adjacent power supply module disposed at an upstream side.

6. An interconnectable power supply module according to claim 5, wherein said downstream signal connecting terminal is disposed on a side of said power supply module opposite to which said upstream signal connecting terminal is disposed.

7. An interconnectable power supply module according to claim 1, further comprising:
    a plurality of tabs at two opposite sides of said power supply module; and
    a tab opening at corresponding sides in order to engage with said plurality of tabs to connect said power supply module to an adjacent power supply module.

8. An interconnectable power supply module according to claim 4, wherein said control unit causes said power generator (i) to lower a voltage level of the output power when a load imposed on said power generator is sufficiently large, and (ii) to increase a voltage level of the output power when the load imposed on said power generator is sufficiently small.

9. An interconnectable power supply module according to claim 4, wherein said control unit operates as a master to control at least one other power supply module, the master providing a timing signal to said at least one other power supply module to ensure that an output waveform of the output power is synchronous among each of said power supply modules.

10. An interconnectable power supply module according to claim 4, further comprising a switching unit to switch a power route to said power supply socket between the output power from said power generator and the external power source.

11. An interconnectable power supply module according to claim 10, wherein said control unit operates as a master to control at least one other power supply module, the master outputting a start signal to said power generator of said at least one other power supply module to start providing the output power when said switching unit of each of said power supply modules has completed switching the power route.

12. An interconnectable power supply module according to claim 10, wherein said control unit monitors a battery status and lowers a voltage level of the output power when the battery status has deteriorated.

13. An interconnectable power supply according to claim 12, wherein said control unit operates as a master by outputting a start signal to start monitoring of said battery in response to which said switching unit of said at least one other power supply module switches the power route to the external power source when the battery status has deteriorated.

14. An interconnectable power supply module according to claim 4, wherein said control unit further comprises:
    an overload sensor to detect a overload; and
    an overload display to display a detecting result from said overload sensor.

15. An interconnectable power supply module according to claim 14, wherein said control unit is located closer to the external power source than at least one other power supply module, said control unit operates as a master to control the at least one other power supply module, and wherein said overload sensor detects a total amount of load connected to each of said power supply modules, and said overload display displays an overload message representing the total amount of load.

16. An interconnectable power supply module according to claim 14, wherein said control unit comprises a memory for storing data concerning a maximum number of power supply modules to determine the occurrence of an overload condition, and wherein said overload display displays the overload condition.

17. An interconnectable power supply module according to claim 1, further comprising an auxiliary battery for replacing said battery.

18. An expandable power supply for supplying power to an external load, said expandable power supply comprising a plurality of adjacent power supply modules, each power supply module comprising:

a battery;

a battery charger operating to charge said battery;

a power generator operating to convert an electrical charge stored in said battery to generate output power for the external load;

a power supply plug for receiving external power from an external power source;

a power supply socket configured to couple the external power received from the external power source to an adjacent power supply module;

an external load output socket on which output power is supplied to the external load from one of the external power source and said power generator; and a connecting terminal selectively coupling the external load output power to the adjacent power supply module.

19. An expandable power supply according to claim 18, wherein said expandable power supply supplies AC power.

20. An expandable power supply according to claim 18, wherein, in each of said plurality of adjacent power supply modules, said external load output socket is coupled to said power generator during an external power source outage.

21. An expandable power supply according to claim 18, wherein each of said plurality of adjacent power supply modules further comprises a control unit capable of controlling each power supply module that comprises said expandable power supply.

22. An expandable power supply according to claim 21, wherein each of said plurality of adjacent power supply modules further comprises:

a downstream signal connecting terminal capable of coupling a control signal from said control unit to an adjacent power supply module disposed at a downstream side; and an upstream signal connecting terminal capable of coupling a control signal from said control unit to an adjacent power supply module disposed at an upstream side.

23. An expandable power supply according to claim 22, wherein said downstream signal connecting terminal is disposed on a side of said power supply module opposite to which said upstream signal connecting terminal is disposed.

24. An expandable power supply according to claim 18, wherein each of said plurality of adjacent power supply modules further comprises:

a plurality of tabs at two opposite sides of said power supply module; and a tab opening at corresponding sides in order to engage with said plurality of tabs to connect said plurality of power supply modules.

25. An expandable power supply according to claim 21, wherein said control unit causes said power generator (i) to lower a voltage level of the output power when a load imposed on said power generator is sufficiently large, and (ii) to increase a voltage level of the output power when said load imposed on said power generator is sufficiently small.

26. An expandable power supply according to claim 21, wherein said control unit operates as a master to control at least one other power supply module, the master providing a timing signal to said at least one other power supply module to ensure that an output waveform of the output power is synchronous among each of said power supply modules.

27. An expandable power supply according to claim 21, wherein each power supply module further comprises a switching unit to switch a power route to said power supply socket between the output power from said power generator and the external power source.

28. An expandable power supply according to claim 27, wherein said control unit operates as a master to control at least one other power supply module, the master outputting a start signal to said power generator of said at least one other power supply module to start providing the output power when said switching unit of each of said power supply modules have completed switching the power route.

29. An expandable power supply according to claim 27, wherein said control unit monitors a battery status and lowers a voltage level of the output power when the battery status has deteriorated.

30. An expandable power supply according to claim 29, wherein said control unit operates as a master by outputting a start signal to start monitoring of said battery in response to which said switching unit of said at least one other power supply module switches the power route to the external power source when the battery status has deteriorated.

31. An expandable power supply according to claim 21, wherein said control unit further comprises:

an overload sensor to detect a overload; and an overload display to display a detecting result from said overload sensor.

32. An expandable power supply according to claim 31, wherein said control unit of a power supply module located closest to the external power source operates as a master to control at least one other power supply module, and said overload sensor detects a total amount of load connected to each of said power supply modules, and said overload display displays an overload message representing the total amount of load.

33. An expandable power supply according to claim 31, wherein said control unit comprises a memory for storing data concerning a maximum number of power supply modules to determine the occurrence of an overload, and wherein said overload display displays the occurrence of the overload.

34. An expandable power supply according to claim 18, further comprising an auxiliary battery for replacing said battery.

* * * * *